Figure 1:
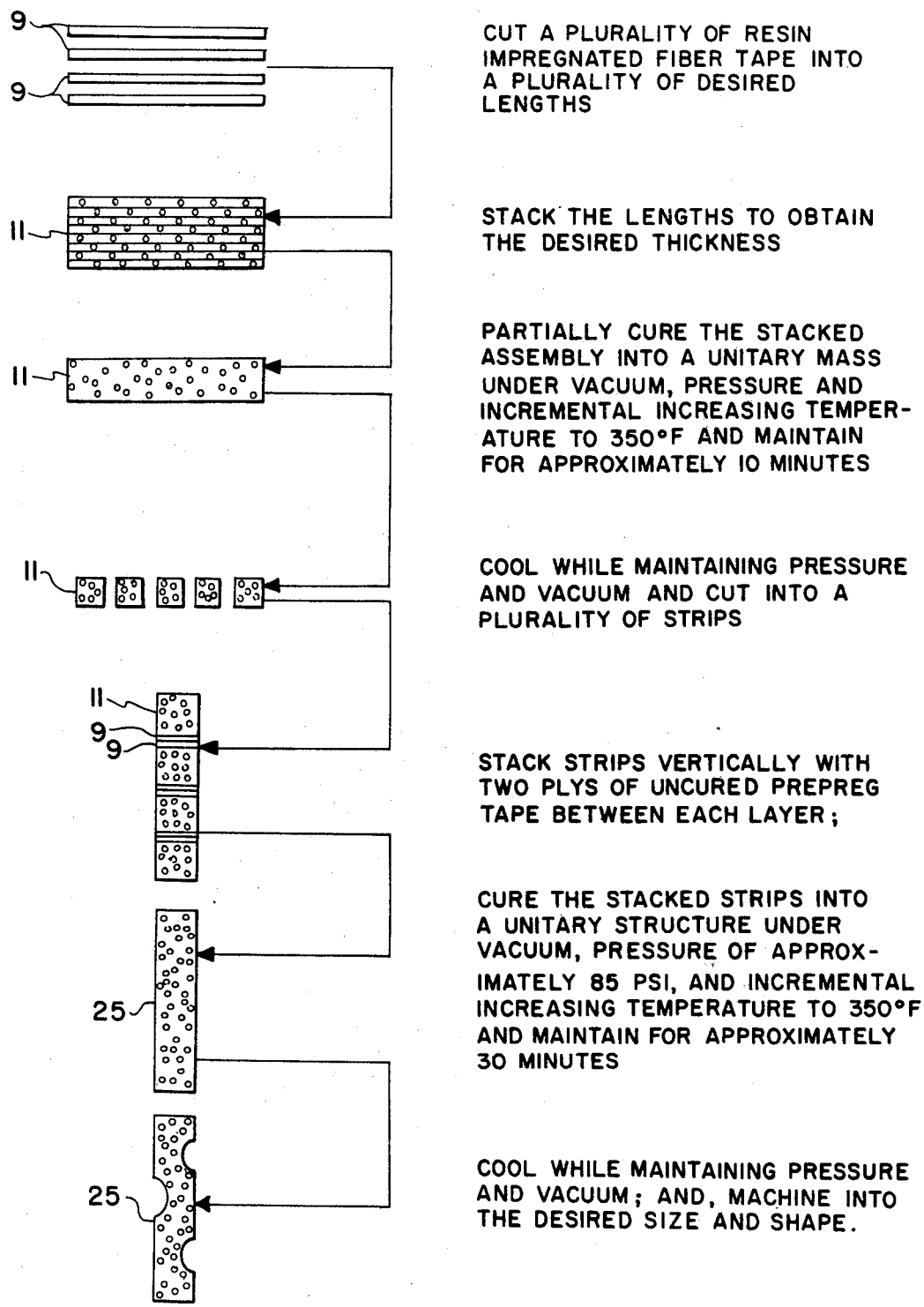

United States Patent [19]

Dickerson

[11] 4,065,340

[45] Dec. 27, 1977

[54] COMPOSITE LAMINATION METHOD

[75] Inventor: George E. Dickerson, Yorktown, Va.

[73] Assignee: The United States of America as represented by the National Aeronautics and Space Administration, Washington, D.C.

[21] Appl. No.: 792,067

[22] Filed: Apr. 28, 1977

[51] Int. Cl.² ............... B32B 31/06; B32B 31/16
[52] U.S. Cl. .............................. 156/154; 156/264; 156/285; 156/286; 156/289; 156/300; 156/306; 156/311; 264/90; 264/157; 428/294; 428/302
[58] Field of Search ............... 156/161, 219, 285, 286, 156/311, 312, 313, 288, 264, 154, 289, 153, 299, 300, 306; 264/135, 137, 259, 261, 263, 264, 90, 157; 428/290, 295, 294, 301, 302

[56] References Cited

U.S. PATENT DOCUMENTS

| 3,573,126 | 3/1971 | Kougel | 156/288 |
| 3,575,756 | 4/1971 | Maus | 156/286 |
| 3,730,797 | 5/1973 | Jensen | 156/264 |
| 3,779,851 | 12/1973 | Hertz | 156/161 |
| 3,867,221 | 2/1975 | Chant | 156/312 |
| 3,969,177 | 7/1976 | Doran et al. | 156/288 |

*Primary Examiner*—William A. Powell
*Assistant Examiner*—Jerome W. Massie
*Attorney, Agent, or Firm*—Wallace J. Nelson; Howard J. Osborn; John R. Manning

[57] ABSTRACT

A process for preparing relatively thick composite laminate structures wherein thin layers of prepreg tapes are assembled, these thin layers are cut into strips that are partially cured, stacked into the desired thickness with uncured prepreg disposed between each layer of strips and the thus formed laminate finally cured and thereafter machined to the desired final dimensions.

11 Claims, 2 Drawing Figures

COMPOSITE LAMINATION METHOD

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Contemporary and future aerospace vehicle structural requirements appear to find advantageous features in the recent advances in filamentary composite materials. Structural designs utilizing composite materials to exploit the unidirectional nature thereof appear promising in aerospace structural components. Relatively thin resin preimpregnated carbon, graphite and other fiber tapes are commercially available wherein the fibers are parallel monofilaments that extend the length of the tape. Thin laminates of these tapes have been utilized heretofore but efforts to cure thick laminate sections have been difficult and have resulted in low quality of uneven physical property characteristics due to the entrapment of air or polymer by-products within the laminate caused by premature cure of the outer perimeter areas that close off the venting paths of the by-products and air. This has also caused density variation through the laminates since, as the thicker laminate warms and becomes viscous, the laminating pressures usually cause more resin flow or movement than desired to thereby create a washing effect or disorientation of the fibers and a resulting reduction of the directional strength. Further, as these prior art attempts to form thick laminates were cured, the chemical reactions of the polymer created heat via exothermic reactions faster than the surrounding surface could dissipate it. This caused the polymer to boil off by-products faster than they could escape with a corresponding temperature increase accelerating the cure and trapping bubbles in the laminate.

There is therefore a definite need in the art for a process to prepare relatively thick laminate sections of composite materials for use in aerospace vehicle structures.

Accordingly, it is an object of the present invention to provide a new and unobvious process for laminating and curing relatively thick sections of resin preimpregnated fiber tape.

Another object of the present invention is a process for making laminate composite structural elements having controlled orientation of the monofilament fibers in the laminates.

A further object of the present invention is a process to produce void free thick composite laminates.

An additional object of the present invention is a process for securing partially cured composite laminates together to form a unitary structure.

BRIEF DESCRIPTION OF THE INVENTION

According to the present invention the foregoing and other objects are attained by cutting a plurality of equal lengths from a resin impregnated fiber tape, stacking these lengths of tape longitudinally upon each other to obtain the desired thickness, partially curing the stacking assembly into a unitary mass under vacuum, external pressure and while incrementally increasing the temperature 2-3° F. per minute to 350° F. and maintaining this temperature for approximately ten minutes. This partially cured assembly is then permitted to cool to room temperature, maintaining the vacuum and external pressure thereon until the temperature drops to as least 150° C. This partial cure time and temperature is controlled such that the degree of the cure temperature is only sufficient to lock the fibers in place, eliminate voids and to produce laminates capable of withstanding physical handling, cutting and machining. The cooled partially cured assembly may then be cut into a plurality of strips. This plurality of partially cured strips are stacked vertically in layers atop each other with two plies of uncured prepreg tape disposed between each layer. This stacked assembly is then finally cured into a unitary structure under vacuum, an external pressure of approximately 85 psi and an incremental increasing temperature to 350° F. that is maintained for approximately thirty minutes for final cure. The cured structure is then permitted to cool to room temperature while maintaining the vacuum and external pressure until the temperature drops to at least 150° F. After cooling, the structure may be machined into the final desired size and shape.

The prepreg tapes, as mentioned hereinbefore, are commercially available and the term "prepreg" is a term of art denoting preimpregnated unidirectional continuous filament fiber materials that may be temperature cured to provide a rigid composite structure. The prepreg employed in the specific illustration herein was the Hercules Incorporated's magnamite prepreg-type 3501-AS. This is a graphite fiber epoxy and employs a thermosetting epoxy resin matrix that cures at 350°±10° F. for a period of 30 ± 5 minutes. The thermosetting epoxy resin is tetraglycidylmethylenedianiline, and is available from CibaGeigy Corporation as MY-720. In an analysis of one lot of Hercules' 3501-AS, the AS graphite fibers constituted 63.8 percent by weight while the resin matrix made up the remaining 36.2 percent. This 36.2 percent was analyzed and for each 100 parts by weight of resin, there was found 32 parts by weight of diaminodiphenylsulfone curing agent and 1.5 parts by weight accelerator. An example accelerator employed is boron trifluoride monomethylamine complex, $BF_3.MEA$ or Ozark-Mahoney's Resicure-2. The "AS" in Hercules' 3501-AS denotes the grade of graphite fiber employed in the prepreg. According to the manufacturer, the graphite fibers in 3501-AS graphite-epoxy prepreg have a diameter of 7.8-8.1 microns, an average density of 0.0645-0.0660 lb/in$^3$ and a modulus of 30−34 × 10$^6$ psi. The 3501 resin has a modulus of 0.5 × 10$^6$ psi and a Poisson's ratio of 0.350. Other prepreg systems are commercially available from different manufacturers under a variety of tradenames. For example, the Whittaker Corporation of Costa Mesa, California markets a prepreg tape under the tradename RIDIGITE 5208 employing a thermosetting resin curing at 355°± 10° F. for a period of 120 ± 5 minutes employed as a matrix with a variety of carbon fibers to produce RIGIDITE prepreg that would be equally applicable in the practice of the present invention with minor adjustments made for the curing times and temperatures for the specific resin in the prepreg.

The impregnation of the carbon or other fibers to prepare prepregs is a hot melt process that is free of solvents to provide outstanding handling characteristics, tack, long out time, and essentially void-free laminates. After impregnation with the epoxy, the resulting prepreg is cut into the desired width and rolled for storage under refrigeration in the temperature range of 0° F. or below and in a sealed container. The storage life of the prepreg at these temperatures is at least six months although the manufacturers normally only provide a warranty period of ninety days. If maintained at room temperature i.e., 70° ± 5° F. the storage life is approximately fourteen days. The graphite or carbon fibers utilized in making the prepreg are available in various diameters from numerous commercial sources, for example, Hercules, Morganite, Stackpole, Union Carbide and others. In one specific example of the Whittaker Corporation product, the prepreg was RIGI-DITE 5208-T-300 wherein the T-300 refers to Union Carbide's tradename Thornel 300 graphite fibers. These and all other fibers contemplated in use of the present invention are continuous type fibers that extend the length of the prepreg tapes. Other prepreg tapes that are suitable in practice of the present invention are commercially available from the 3-M Company, Fiberite Company and others. Although the prepreg tapes are sold commercially in various widths, from slit widths as narrow as 0.376 inch to twelve inch widths, the most commonly used width is three inches. These widths may be cut when ready for use to that desired for the particular application. Also, the thickness of the prepreg tapes that are commercially available vary from those providing a cured ply thickness in the range of 0.0015 inch to 0.0025 inch for ultra-thin applications to the standard range of 0.005 inch to 0.008 inch as employed in the specifically desired application herein. The cured thickness of a single ply or layer is primarily dependent upon the graphite fiber diameter with the prepreg tapes having a fiber content of 58 ± 3% by volume and an epoxy content of 42 ± 3% and with a 60–40% graphite/epoxy being preferred.

Figure 2:
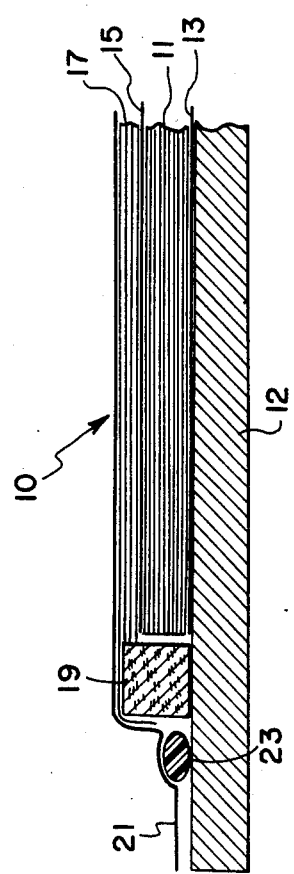

A more complete appreciation of the invention and many of the attendant advantages thereof will be readily apparent as the same becomes better understood by reference to the following detailed description when considered in connection with the accompanying drawings wherein:

FIG. 1 is a flow chart representing various steps in the process of the present invention; and FIG. 2 is a part sectional view of a laminate lay-up ready for positioning in a heated pressure vessel.

Referring now to the drawings and more particularly to the flow chart of FIG. 1, a plurality of equal lengths 9 of the prepreg tape selected are cut and laid out on a clean surface, such for example, an aluminum or stainless steel plate. When the width of the final structure to be built exceeds the width of the tape employed, the various lengths of tape are combined by over-lapping a side portion of an adjacent length to provide the necessary width. Each layer or ply of the thus formed wide surface area or ply is provided with staggered amounts of overlap between the adjacent tape sections forming the ply to prevent undue bulges at these "seams" in the final lay-up of multiple plies.

The plurality of lengths thus formed are stacked to obtain the desired thickness. In a specific example, twenty-five layers or plies of six-inch lengths of three-inch wide tape were stacked by hand lay-up to form a thin laminate 11 approximately one-eighth inch thick.

Referring now more particularly to FIG. 2, the mechanism for facilitating cure of this lay-up is shown and designated generally by reference numeral 10. In this lay-up, the stacked or uncured material 11 is positioned on a stainless steel caul plate 12 with a 0.002-inch teflon coated glass cloth 13 serving as a separator therebetween. A second identical separator cloth 15 is positioned atop the uncured material stack or laminate 11 and a glass bleeder cloth 17 placed over separator cloth 15. This glass bleeder cloth is available in .008-inch thickness and one layer of this thickness is employed for each four layers in laminate 11 to absorb resin pressed from the assembly during pressure application to the laminate. Also, a cork dam 19 is disposed around laminate 11 to prevent resin loss during the laminate cure cycle. A vacuum bag 21 or membrane, such for example Nylon-6 film, is disposed over the entire assembly and sealed to caul plate 12 via a suitable vacuum sealing compound 23, such for example "Blue Strip." Bag 21 is connected to a suitable vacuum pump, not shown, for evacuating the laminate 11 during cure.

Caul plate 12 serves as part of the vacuum unit, as a tool for inserting lay-up 10 into a hydraulic press pressure vessel, not shown, and as a support surface for the bottom of laminate 11 during the cure cycle.

For partially curing, a full vacuum (30 inches mercury) was applied to the assembly and the temperature raised from room temperature to 350° F. in increments of 2°–3° F. per minute. When the temperature reached 225° F. an external pressure of 85 psi was applied to the assembly. The vacuum, external pressure and 350° F. temperature was held for ten minutes or one-third of the time required for final cure of the prepreg manufacturer's recommendation. The assembly was then permitted to cool to room temperature with the vacuum and external pressure maintained until the temperature dropped below 150° F.

At this stage of partial curing the laminate is a unitary mass having the fibers locked in place and is capable of withstanding physcial handling, machining and cutting as desired. This partially cured laminate in the specific example above was cut into strips (FIG. 1) approximately one and one-fourth inch wide by six inches long and parallel with the fiber orientation. The cut strips were stacked vertically atop each other with two plies of raw or uncured prepreg tape of equal dimensions and parallel fiber orientation interposed between each laminate strip. This stacked strip assembly was placed between separator and bleeder plies as before, returned to the vacuum bag and hydraulic press.

Final cure was affected by applying a full vacuum to the assembly, raising the temperature to 350° F. in increments of 2–3° F. per minute and during heat-up, applying and maintaining an external pressure of 85 psi to the assembly when the laminate temperature reaches 225° F. This vacuum, external pressure and 350° F. temperature are maintained for thirty minutes. The assembly then was permitted to cool to room temperature while maintaining the vacuum and external pressure until the temperature dropped below 150° F.

After cooling to room temperature, the final cured structure 25 was machined to the desired contour, size and exterior configuration in a conventional manner.

Composite structural elements formed by the above-described process are essentially homogeneous throughout and possess linear elastic and transversely isotropic physical property characterics. Although the above specific example denotes specific times and temperatures for the resin cure system, slight variations in these parameters are required for different resin systems and as part of the particular manufacturer's specifications.

The present invention is also readily adaptable to fabrication of entire engineered structures or component parts of aerospace vehicles, and the like. For example, structures containing thick sections such as ribs, channels, bosses, etc., may be adjoined to thin skins of like materials by machining and finalizing the shape of the final structure while in the partially or final cured state and thereafter interposing two plies of uncured prepreg between the machined structure and the thin partially or final cured skin. Thereafter, the final cure process described hereinbefore is followed to cure the structure and skin into a unitary final configuration. This curing assembly process eliminates the need for a bonding process to attach vehicular skins as well as avoiding the possible detrimental or unnecessary thermal or mechanical connections which could lead to internal stresses within the structure. Thus, the entire vehicular skin could be attached by use of the present invention to provide a more homogeneous vehicular structure.

Also, although the specific embodiment described hereinabove maintains parallel orientation of the fibers in adjacent layers or plies, this is not required and in some instances it may be desirable to lay-up the various layers in different angular fiber orientation. Thus, any angular relationship of the fibers in adjacent layers or plies between the 0° and 180° i.e., 1° to 179° is also considered within the teachings and scope of the present invention. In each instance the uncured or raw prepreg layers employed would have the fiber orientation thereof parallel with that in the adjacent cured or partially cured layer.

Also, although the specific examples described herein are concerned with graphite or carbon fiber prepreg systems, the invention is not so limited. For example, thick composite structures may be constructed according to the present invention utilizing continuous filament boron fibers in an epoxy matrix prepreg, as well as a commercially available prepreg utilizing DuPont's Kevlar fibers in an epoxy matrix. As in the graphite systems, these prepregs are available in various widths, strengths and thicknesses and may be selected, cut and laid up to suit the needs of the structure being constructed.

It is therefore to be understood that the description of the specific example described herein is to be taken as the preferred embodiment only, and that the invention may be practiced otherwise than as specifically described. Thus, various modifications and variations are considered possible in the light of the above teachings.

It is therefore to be understood that the invention may be practiced otherwise than as specifically described.

What is claimed as new and desired to be secured by Letters Patent of the United States is:

1. A process of preparing structural components of composite laminates comprising:
   providing prepreg resin impregnated fiber tape material having the fibers therein running the length of the tape,
   cutting the prepreg tape into a plurality of desired lengths,
   stacking the plurality of lengths of tape in layers to a predetermined thickness while maintaining the same fiber orientation for each layer,
   partially curing the stacked tape assembly into a unitary mass under vacuum for approximately ten minutes and at an elevated temperature of at least 350° F.,
   cooling the partial cured mass and cutting it into a plurality of strips along the parallel orientation of the fibers,
   stacking this plurality of strips vertically in layers atop each other with two strips of uncured prepreg tape disposed between each of the plurality of laminate strips,
   curing the stacked layer strips into a unitary structure under vacuum, pressure and an elevated temperature of at least 350° F. for least thirty minutes,
   cooling the cured structure to a minimum of 150° F. while maintaining the pressure and vacuum, and after allowing to cool to room temperature,
   machining the unitary structure formed into the final desired size and shape.

2. The method of claim 1 wherein the step of partially curing the stacked tape assembly into a unitary mass includes, placing the stacked assembly between separator cloths and fiberglass bleeder cloths, bagging the resulting stack assembly in a vacuum bag, and placing the bagged assembly in a pressure vessel.

3. The method of claim 2 wherein the bagged stack assembly in the pressure vessel is heated from room temperature to 350° F. in increments of 2°–3° F. per minute after the assembly is placed under full vacuum.

4. The method of claim 3 wherein a pressure of 85 psi external pressure is applied and maintained to the assembly when the temperature thereof reaches 225° F.

5. The method of claim 4 wherein the vacuum and external pressure are maintained until the temperature reaches and is maintained at about 350° F. for approximately ten minutes.

6. The method of claim 5 wherein the vacuum and external pressure are maintained while permitting the assembly to cool to at least 150° F. prior to removal of the assembly from the pressure vessel.

7. The method of claim 1 wherein the plurality of partially cured strips are stacked so as to maintain the fiber orientation of each layer in the stack parallel to that of the adjacent layer.

8. The method of claim 1 wherein the plurality of partially cured strips are stacked in layers so as to maintain the fiber orientation of each layer in the stack perpendicular to that of the adjacent layer.

9. The method of claim 1 wherein the plurality of partially cured strips are stacked in layers so as to maintain the fiber orientation of each layer in the stack at an angular relationship to that of the adjacent layer in the range of 1° to 179°.

10. The method of claim 1 wherein the fiber orientation of the strips of uncured prepreg tape between each layer in the stack is disposed parallel with the fiber orientation of the adjacent layer of the stack.

11. A process of preparing structural components of composite laminates and skin covers therefor comprising:
   providing prepreg resin impregnated fiber tape material having the fibers therein running the length of the tape,
   cutting the prepreg tape into a plurality of desired lengths,
   stacking the plurality of lengths of tape in layers to a predetermined thickness while maintaining the same fiber orientation for each layer, partially curing the stacked tape assembly into a unitary mass under vacuum and at an elevated temperature of at least 350°, cooling the partially cured mass and machining it into the desired configuration, preparing a partially cured prepreg skin cover for the machined configuration from layers of prepreg tape by the same process, positioning this partially cured skin onto the machined configuration so as to maintain parallel fiber orientation between the configuration and skin and with two strips of uncured prepreg tape disposed between the configuration and skin and having the fibers therein disposed parallel to the fibers in the configuration and skin, curing the stacked configuration and skin into a unitary structure under vacuum, pressure and an elevated temperature of at least 350° F. for at least thirty minutes, and maintaining the pressure while cooling the cured structure to a minimum of 150° F. while maintaining the pressure and vacuum.

* * * * *